(12) United States Patent
Brevick

(10) Patent No.: US 11,549,559 B1
(45) Date of Patent: Jan. 10, 2023

(54) DUAL DIRECTION, SELECTABLE ONE-WAY CLUTCH HAVING CENTER PLATE WITH DRIVE OPENINGS

(71) Applicant: Schaeffler Technologies AG & Co. KG, Herzogenaurach (DE)

(72) Inventor: John Brevick, Newaygo, MI (US)

(73) Assignee: Schaeffler Technologies AG & Co. KG, Herzogenauach (DE)

( * ) Notice: Subject to any disclaimer, the term of this patent is extended or adjusted under 35 U.S.C. 154(b) by 0 days.

(21) Appl. No.: 17/738,151

(22) Filed: May 6, 2022

(51) Int. Cl.
*F16D 41/16* (2006.01)
*F16D 41/12* (2006.01)

(52) U.S. Cl.
CPC ........... *F16D 41/16* (2013.01); *F16D 41/125* (2013.01)

(58) Field of Classification Search
CPC ...... F16D 41/16; F16D 41/125; F16D 41/061; F16D 41/08
See application file for complete search history.

(56) References Cited

U.S. PATENT DOCUMENTS

| | | |
|---|---|---|
| 5,597,057 A | 1/1997 | Ruth et al. |
| 6,244,965 B1 | 6/2001 | Klecker et al. |
| 8,286,772 B2 | 10/2012 | Eisengruber |
| 9,303,699 B2 | 4/2016 | Kimes et al. |
| 10,316,904 B2 | 6/2019 | Hand et al. |
| 2004/0159517 A1* | 8/2004 | Thomas ............... F16D 41/16 192/39 |
| 2021/0285505 A1* | 9/2021 | Etzel ................... F16D 41/16 |

* cited by examiner

*Primary Examiner* — Timothy Hannon
(74) *Attorney, Agent, or Firm* — Volpe Koenig

(57) ABSTRACT

A dual direction, selectable one-way clutch is provided that can be set to be fully free to rotate in both directions, can be fully locked in both directions, and can provide a one-way clutch option in both directions. The actuator to change the clutch state is electromechanical and only requires power to change a coupling state of the clutch. The clutch is formed by two sets of struts carried by pocket plates on opposite sides of a center plate that includes spaced apart drive openings, and the struts are engageable/disengageable with the drive openings in order to provide for the different locked and one-way clutch states. One or more actuator rings are provided to activate or disengage the struts.

18 Claims, 3 Drawing Sheets

US 11,549,559 B1

DUAL DIRECTION, SELECTABLE ONE-WAY CLUTCH HAVING CENTER PLATE WITH DRIVE OPENINGS

FIELD OF INVENTION

The disclosure relates to a one-way clutch with the capability to fully disconnect, as well as connect in one or both directions, two concentric rotating shafts.

BACKGROUND

Selectable one-way clutches have many applications, including in conventional automatic transmissions as well as battery electric vehicle axles. The conventional clutch requires a hydraulic pump, passages, controls, piston, and wet clutch pack with a large package size, and is subject to parasitic losses (open clutch drag and hydraulic pump power).

Roller one-way clutches provide good function, but the torque capability relies on friction. One-way clutches with a ratcheting pawl as the driver can carry substantial torque in a small package, but provide limited functionality.

It would be desirable to find a cost-effective solution to provide additional features in a clutch, such that the coupling created by the clutch has the ability to rotate fully free in both directions, to be fully locked in both directions, as well as to provide a one-way clutch option in either direction.

SUMMARY

According to the disclosure, a dual direction, selectable one-way clutch is provided that can be set to be fully free to rotate in both directions, can be fully locked in both directions, and can provide a one-way clutch option in both directions. The actuator to change the clutch state can be electromechanical such that it only requires power to change a coupling state of the clutch. The present clutch architecture functions with two concentric rotating shafts, as well as in a grounding (i.e., shaft fixing to a housing or chassis) state.

In one aspect, a dual direction, selectable one-way clutch, is provided having first and second concentric shafts, with a center plate rotationally fixed to the first shaft, and the center plate including a plurality of spaced apart drive openings. A first pocket plate is rotationally fixed to the second shaft, with the first pocket plate including a plurality of first pockets. First struts are pivotally located in at least some of the plurality of first pockets, with the first struts each including a first engagement portion directed toward the center plate and oriented in a first rotational direction and a first actuation portion directed axially away from the center plate. The first struts are pivotable between an engaged position in which the first engagement portions are engaged in respective ones of the spaced apart drive openings in the center plate, and a disengaged position, in which the first engagement portions are disengaged from the center plate. A second pocket plate is also rotationally fixed to the second shaft, which can be via a connection to the first pocket plate, and is located on an opposite side of the center plate from the first pocket plate. The second pocket plate includes a plurality of second pockets, and second struts are pivotally located in at least some of the plurality of second pockets. The second struts include a second engagement portion directed toward the center plate and oriented in a second rotational direction, opposite to the first rotational direction, and a second actuation portion directed axially away from the center plate, and the second struts are pivotable between an engaged position in which the second engagement portions are engaged in respective ones of the spaced apart drive openings in the center plate, and a disengaged position, in which the second engagement portions are disengaged from the center plate. A first actuator plate is provided that is axially movable between an actuated position, in which the first actuation portions of the first struts are in the actuated position with the first engagement portions of the first struts engaged in respective ones of the spaced apart drive openings in the center plate, and a deactivated position, in which the first actuator plate presses the first actuation portions of the first struts axially toward or into the first pockets such that the first engagement portions of the first struts are in the disengaged position, disengaged from the spaced apart drive openings in the center plate. A second actuator plate is also provided that is axially movable between an actuated position, in which the second actuation portions of the second struts are in the actuated position with the second engagement portions of the second struts engaged in respective ones of the spaced apart drive openings in the center plate, and a deactivated position, in which the second actuator plate presses the second actuation portions of the second struts axially toward or into the second pockets such that the second engagement portions of the second struts are in the disengaged position, disengaged from the spaced apart drive openings in the center plate.

Using this arrangement, a dual direction, selectable one-way clutch is provided with a reduced axial space that can be set to be fully free to rotate in both directions, can be fully locked in both directions, and can provide a one-way clutch option in both directions. This can be accomplished with the first and second actuator plates both in the actuated position, providing a fully locked connection between the first and second shafts in both rotational directions. With the first actuator plate in the actuated position and the second actuator plate in the deactivated position, a one-way clutch is provided that is active for transferring force only in the first rotational direction. With the first actuator plate in the deactivated position and the second actuator plate in the actuated position, a one-way clutch is provided that is active for transferring force only in the second rotational direction. With the first and second actuator plates both in the deactivated position, the first and second shafts are freely rotatable relative to one another in both rotational directions.

In one embodiment, the first and second actuator plates include splined radially inner surfaces that slidingly engage on respective first and second splined supports that are rotationally fixed relative to the second shaft.

In one embodiment, at least one actuator is connected to the first and second actuator plates to axially move the first and second actuator plates between the respective actuated and deactivated positions.

In one arrangement, the at least one actuator comprises respective first and second actuators that are engaged, respectively, with the first actuator plate and the second actuator plate.

In one arrangement, the first actuator comprises a first solenoid connected to a first fork that engages a groove in a radially outer surface of the first actuator plate, and the second actuator comprises a second solenoid connected to a second fork that engages a groove in a radially outer surface of the second actuator plate. Here, the first fork can be connected to a first solenoid shaft, and the first solenoid shaft can include detents for the actuated and deactivated positions of the first actuator plate, and the second fork can be connected to a second solenoid shaft, and the second solenoid shaft can includes detent for the actuated and deactivated positions of the second actuator plate. Thus, the first and second forks can be maintained in either of the respective actuated or deactivated positions without requiring the solenoid (or other actuator) to be constantly powered in order to hold one of the two positions.

In one arrangement, the first and second shafts are both rotatable.

In one embodiment, a plurality of first springs are located between the first struts and the first pocket plate that bias the first struts to the engaged position, and a plurality of second springs are located between the second struts and the second pocket plate that bias the second struts to the engaged position.

In one arrangement, in the engaged position of the first struts, the first engagement portions are engaged against respective first circumferential sides of the spaced apart drive openings in the center plate, and in the engaged position of the second struts, the second engagement portions are engaged against respective second circumferential sides of the spaced apart drive openings in the center plate, opposite from the first circumferential sides. Here, the spaced apart drive openings in the center plate are circumferentially spaced apart and located at a same radial distance.

Alternatively, the spaced apart drive openings in the center plate can include a first set of circumferentially spaced apart openings that are located at a first radial distance that are adapted to receive the first engagement portions, and a second set of circumferentially spaced apart openings that are located at a second radial distance that are adapted to receive the second engagement portions. This can be useful for higher load transfer. In a preferred embodiment, the first and second struts have a same strut configuration. This allows for a reduced number of different parts that need to be kept in inventory.

In one embodiment, the strut configuration includes the engagement portion having a greater width than the actuation portion, forming a shoulder at a medial portion of the strut configuration. Additionally, the first and second pockets each include a ledge located in a medial location on which the shoulder is pivotally supported. Alternatively, other means for holding the first and second struts in the respective first and second pockets can be provided.

In another aspect, a method of operating the dual direction, selectable one-way clutch including one or more of the features described herein is provided. The method includes moving both of the first and second actuator plates to the respective actuated positions such that the first engagement portions of the first struts and the second engagement portions of the second struts are engaged in the drive openings in the center plate forming a fully locked connection between the first and second shafts in both rotational directions.

In a further aspect, the method may include moving the first actuator plate to the deactivated position such that the first engagement portions are disengaged from the center plate forming a one-way clutch that is active for transferring force only in the second rotational direction.

In a further aspect, the method may include moving the second actuator plate to the deactivated position such that the second engagement portions are dis-engaged from the center plate forming a one-way clutch that is active for transferring force only in the first rotational direction.

In a further aspect, the method may include moving the first and second actuator plates to the respective deactivated positions such that the first engagement portions are disengaged from the center plate and the second engagement portions are disengaged from the center plate allowing the first and second shafts to be freely rotatable relative to one another in both rotational directions.

Other advantages provided by the present dual direction, selectable one-way clutch are that the electromechanical actuation only requires power to change state. Further, there is low friction torque in the open, deactivated state. There is also the possibility of fast state changes, and low lash in the fully locked (connected in both directions) state. State changes can also be accomplished while turning and under load. This arrangement is also scalable for various torque requirements.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate exemplary embodiments according to the disclosure. In the drawings.

DETAILED DESCRIPTION

Figures 1, 2, 3:
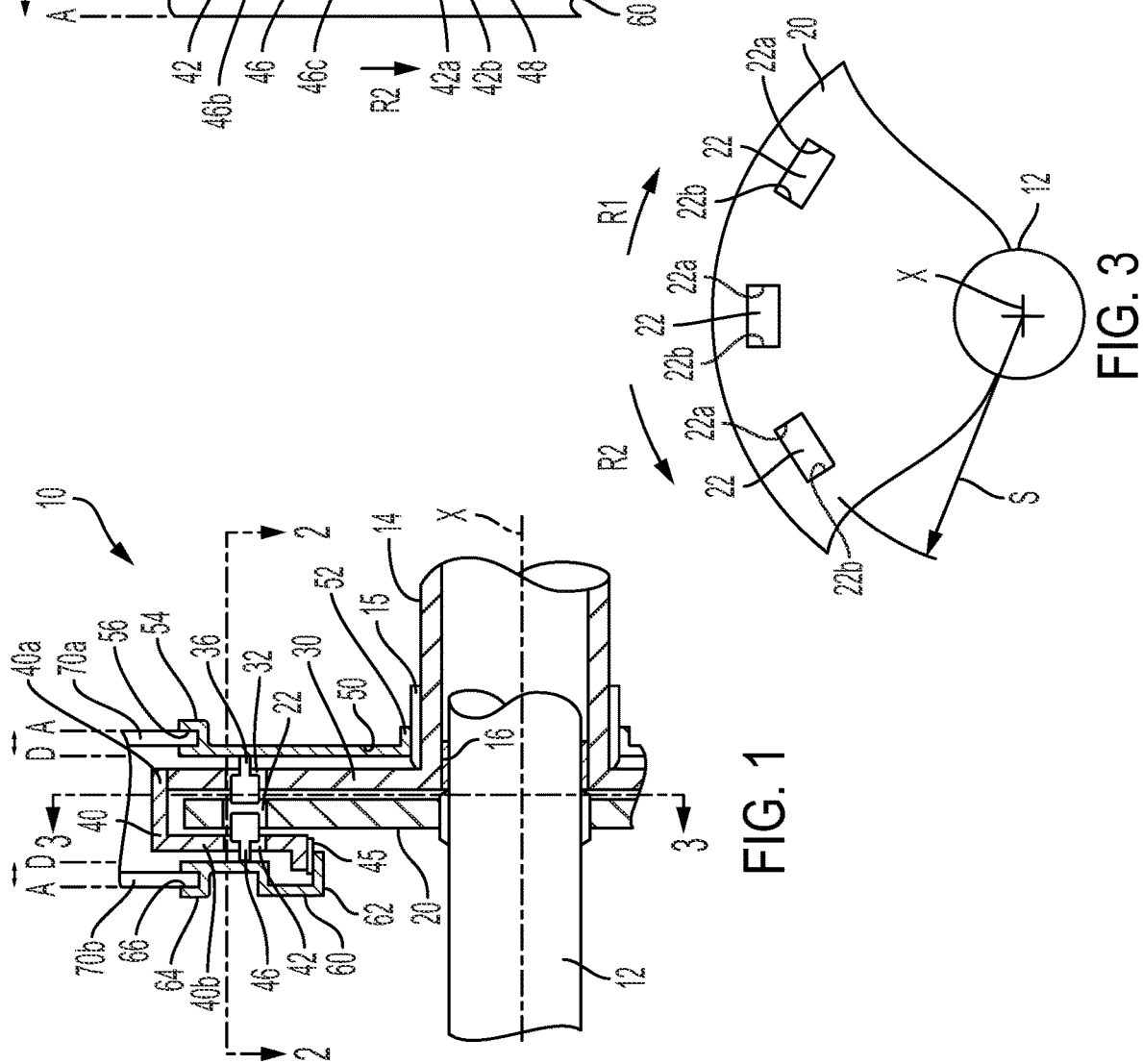
FIG. 1 is a cross-sectional view to a first embodiment of a dual direction, selectable one-way clutch.
FIG. 2 is an enlarged view, partially in cross-section, taken along line 2-2 in FIG. 1.
FIG. 3 is a side view of a partial portion of a center plate taken along line 3-3 in FIG. 1.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b. This would also apply to lists of three or more items in like manner so that individual ones of the items or combinations thereof are included. The terms "about" and "approximately" encompass + or − 10% of an indicated value unless otherwise noted. The terminology includes the words specifically noted above, derivatives thereof and words of similar import. The term "shaft" is used in its broadest sense as a solid or hollow load transmitting body.

Referring to FIGS. 1-6, a first embodiment of a dual direction, selectable one-way clutch 10 ("clutch 10" for short) is shown. As shown in detail in FIG. 1, the clutch 10 is mounted between the first and second concentric shafts 12, 14. A bearing 16 can be used to support one end of the second shaft 14 on the first shaft 12.

A center plate 20 is rotationally fixed to the first shaft 12, and the center plate 20 includes a plurality of spaced part drive openings 22. The spaced apart drive openings 22 are shown in detail in FIG. 3 and are preferably spaced apart equally in a circumferential direction, with each of the drive openings 22 including a first circumferential side 22a and a second circumferential side 22b. The center plate 20 is preferably made of stamped steel. However, it can be formed of other materials using various different processes, such as machining.

Referring to FIGS. 1, 2, 4, and 5, a first pocket plate 30 is rotationally fixed to the second shaft 14. The first pocket plate 30 includes a plurality of first pockets 32. First struts 36 are pivotally located in at least some of the plurality of first pockets 32, and in a preferred embodiment are located in each of the first pockets 32. The first struts 36, for example shown in detail in FIG. 6, include a first engagement portion 36a directed toward the center plate 20 and oriented in a first rotational direction R1 and a first actuation portion 36b directed axially away from the center plate 20. The first struts 36 are pivotable between an engaged position, in which the first engagement portions 36a are engaged in respective ones of the spaced apart drive openings 22 in the center plate 20, preferably against the first circumferential sides 22a, and a disengaged position, in which the first engagement portions 36a are disengaged from the center plate 20. The first pocket plate 30 may be made of steel or any other suitable material.

Still with reference to FIGS. 1 and 2, a second pocket plate 40 is rotational affixed to the second shaft 14 and located on an opposite side of the center plate 20 from the first pocket plate 30. As shown in detail in FIG. 1, the second pocket plate 40 can be L-shaped in cross-section and include an axially extending portion 40a that is connected to a radially outer portion of the first pocket plate 30 and a radially extending portion 40b that extends toward the axis X of the first and second concentric shafts 12, 14. The second pocket plate 40 incudes a plurality of second pockets 42. Second struts 46 are pivotally located in at least some of the plurality of second pockets 42, and preferably in each of the second pockets 42. The second pockets 42 can have a similar configuration to the first pockets 32. The second struts 46 include a second engagement portion 46a directed toward the center plate 20 and oriented in a second rotational direction R2, opposite to the first rotational direction R1. The second struts 46 further include a second actuation portion 46b directed axially away from the center plate 20. The second struts 46 are pivotable between an engaged position in which the second engagement portions 46a are engaged in respective ones of the spaced apart drive openings 22, preferably against the second circumferential sides 22b of the drive openings 22 in the center plate 20, and a disengaged position, in which the second engagement portions 46a are disengaged from the center plate 20. The second pocket plate 40 may be made of steel or any other suitable material.

Figure 5:
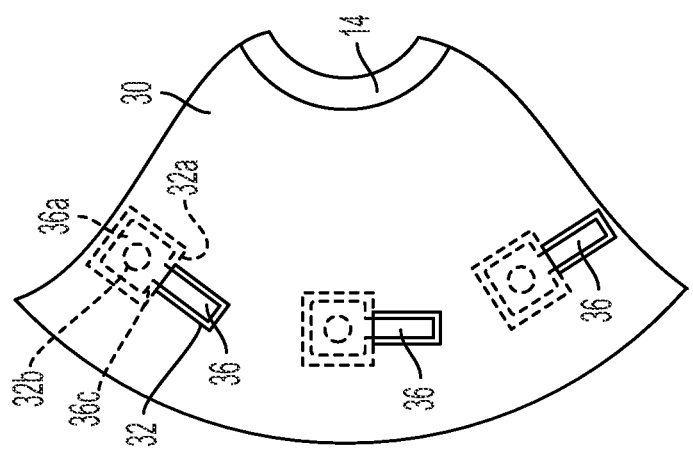
FIG. 5 is an opposite side view of the pocket plate shown in FIG. 4, taken along line 5-5 in FIG. 2.
Figure 6:
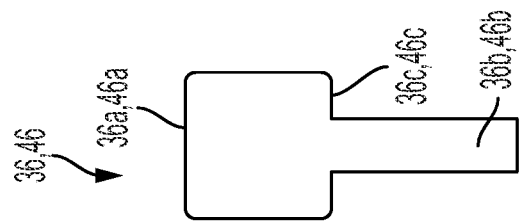
FIG. 6 is a detailed view of an embodiment of a strut used in the dual direction, selectable one-way clutch shown in FIGS. 1 and 2.

Preferably, the first and second struts 36, 46 have a same strut configuration, for example as shown in FIG. 6. Here, the strut configuration includes the engagement portion 36a, 46a having a greater width than the actuation portion 36b, 46b, forming a shoulder 36c, 46c at a medial portion of the strut configuration, and the first and second pockets 32, 42 each including a ledge 32a, 42a located in a medial location on which the respective shoulders 36c, 46c of the first and second struts 36, 46 are pivotally supported, as shown in detail in FIGS. 2, 4, and 5.

Referring again to FIGS. 1 and 2, a first actuator plate 50 is provided that is axially movable between an actuated position A, in which the first actuation portions 36b of the first struts 36 are in the actuated position with the first engagement portions 36a of the first struts 36 engaged in respective ones of the spaced apart drive openings 22 in the center plate 20 (as shown in FIGS. 1 and 2), and a deactivated position D, in which the first actuator plate 50 presses the actuation portions 36b of the first struts 36 axially toward and/or at least partially or fully into the pockets 32 such that the engagement portions 36a of the first struts 36 are in the disengaged position, disengaged from the spaced apart drive openings 22 in the center plate 20. As shown in FIG. 1, the first actuator plate 50 preferably includes a sliding connection 52, which can be a splined connection such that it is slidably moveable in an axial direction on and rotationally fixed to a corresponding spline support 15 located on the second shaft 14. Additionally, the first actuator plate 50 includes a fork cross-section 54 at the radially outer surface that defines a groove 56 in which an actuator 70a can be engaged.

Still with reference to FIGS. 1 and 2, a second actuator plate 60 is provided that is axially movable between an actuated position A, in which the second actuation portions 46b of the second struts 46 are in the actuated position with the second engagement portions 46a of the second struts 46 engaged in respective ones of the spaced apart drive openings 22 in the center plate 20, and a deactivated position D, in which the second actuator plate 60 presses the second actuation portions 46b of the second struts 46 axially toward and/or at least partially or fully into the second pockets 42 such that the engagement portions 46a of the second struts 46 are in the disengaged position, disengaged from the spaced apart openings 22 in the center plate 20.

The second actuator plate 60 also includes a sliding connection 62, preferably a splined connection, such that it is axially movable, but rotationally fixed with respect to the second shaft 14. Here, the sliding connection 62 engages on a second spline support 45 shown located on the radially inner surface of the second pocket plate 40, which is rotationally fixed relative to the second shaft 14. Additionally, the second actuator plate 60 includes a fork cross-section 64 located at the radially outer end that defines a groove 66 that is adapted to be engaged by an actuator 70b. While one preferred configuration of the second actuator plate 60 is illustrated in the drawings, the specific support configuration can be varied.

The clutch 10 can be set to be fully free to rotate in both directions, fully locked in both directions, and provide a one-way clutch option in each direction. Specifically, with the first and second actuator plates 50, 60, both in the actuated position A, shown in FIGS. 1 and 2, a fully locked connection is provided between the first and second shafts 12, 14 in both rotational directions R1, R2. Additionally, with the first actuator plate 50 in the actuated position A and the second actuator plate 60 in the deactivated position D, which would require shifting the second actuator plate 60 to the deactivated position indicated with D in FIGS. 1 and 2, a one-way clutch is provided that is active for transferring force only in the first rotational direction R1. Further, with the first actuator plate 50 in the deactivated position D and the second actuator plate 60 in the actuated position A, which in this case would require moving the first actuator plate 50 to the position D shown in FIGS. 1 and 2, a one-way clutch is provided as active for transferring force only in the second rotational direction R2. Finally, with first and second actuator plates 50, 60 both in the deactivated position D, which would require shifting both the first and second actuator plates 50, 60 to the respective deactivated positions D in FIGS. 1 and 2, the first and second shafts 12, 14 would be freely rotatable relative to one another in both directions R1, R2.

Figure 8:
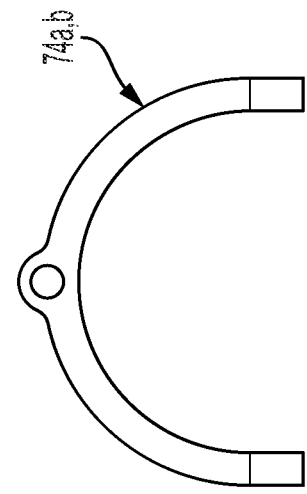
FIG. 8 is a side view of an embodiment of the fork connected to the actuator arrangement shown in FIG. 7.
Figure 7:
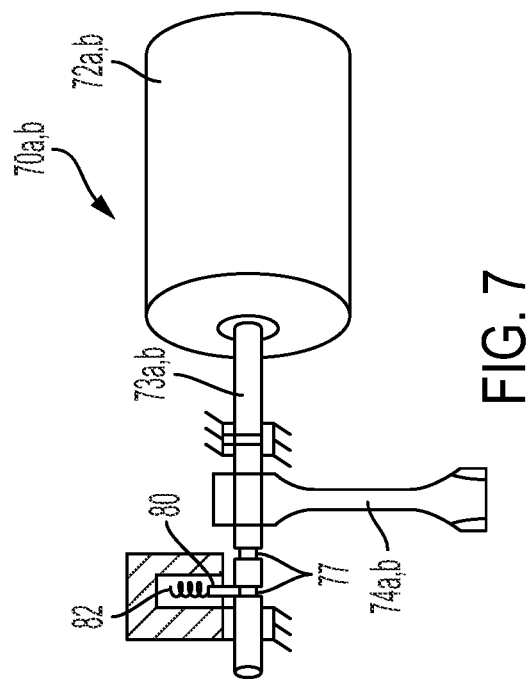
FIG. 7 is a schematic view showing an actuator arrangement used in connection with the dual direction, selectable one-way clutch shown in FIG. 1.

Referring to FIGS. 1, 7, and 8, the clutch 10 may further comprise at least one actuator 70a, 70b connected to the first and second actuator plates 50, 60 to axially move the first and second actuator plates 50, 60 between the respective actuated A and deactivated D positions. As shown in FIG. 1, in the illustrated embodiment the at least one actuator comprises respective first and second actuators 70a, 70b that are engaged, respectively, with the first actuator plate 50 and the second actuator plate 60. As shown in FIG. 7, the first actuator 70a can comprise a first solenoid 72a connected to a first fork 74a, shown in detail in FIG. 8, that engages in the groove 56 in the radially outer surface of the first actuator plate 50. The second actuator 70b can also comprise a second solenoid 72b connected to the second fork 74b that engages in the groove 66 in the radially outer surface of the second actuator plate 60.

Still with reference to FIG. 7, the first fork 74 can be connected to a first solenoid shaft 73a, and this first solenoid shaft 73a may include detents 77 for the actuated A and deactivated D positions of the first actuator plate 50. Similarly, the second fork 74b is connected to a second solenoid shaft 73b, and the second solenoid shaft 73b also includes detents 77 for the actuated A and deactivated D positions of the second actuator plate 60. As shown in FIG. 7, a pin 80 that is biased via a spring 82 can be used in order to hold the respective first and second solenoid shafts 73a, 73b in one of the actuated A or deactivated D positions without the need to keep the solenoid 72a, 72b powered after the axial shift in position has been carried out.

While the actuators 70a, 70b are illustrated as being solenoid actuators, other types of actuators could be utilized, such as a motor driven linear positioning system, a hydraulic actuator, or any other suitable electromechanical device.

Referring again to FIG. 2, in one arrangement a plurality of first springs 38 are located between the first struts 36 and the first pocket plate 30 that bias the first struts 36 to the engaged position. The first springs 38 are located in the blind spring holes 32b in the first pocket plate 30. Additionally, a plurality of second springs 48 are located between the second struts 46 and the second pocket plate 40 that bias the second struts 46 to the engaged position. Here, the second springs 48 are located in blind spring holes 42b of the second pocket plate 40.

The use of springs to bias the first and second struts 36, 46 to the engaged positions is one solution for a clutch 10 that is typically in the fully coupled mode in order to transmit torque in both rotational directions. It is also possible to have the springs bias the first struts 36 and the second struts 46 to the disengaged positions or to provide one or the other of the first struts 36 or the second struts 46 to be biased toward the engaged position while the other of the second struts 46 or the first struts 36 are biased to be in the disengaged position.

Figure 4:
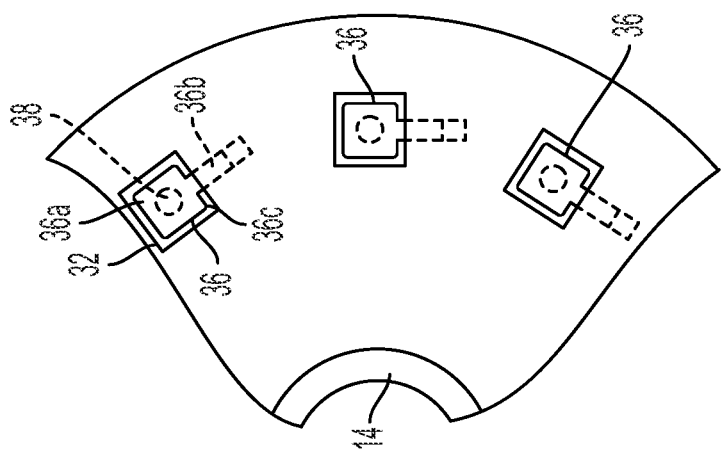
FIG. 4 is a first side view of a pocket plate taken along line 4-4 in FIG. 2.
Figure 9:
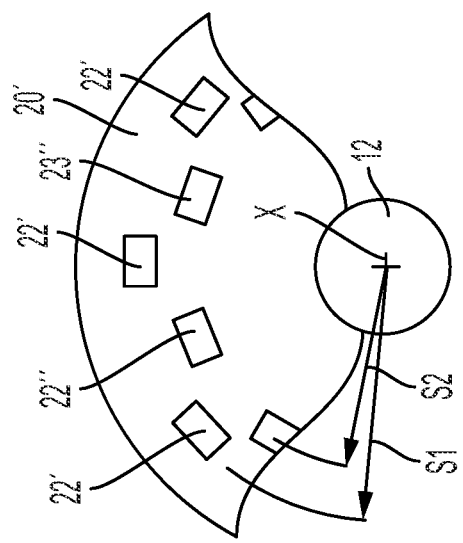
FIG. 9 is a side view similar to FIG. 3 of a center plate used in a further embodiment of the dual direction, selectable one-way clutch.

As shown in FIGS. 1, 4, and 5, in the first embodiment the spaced apart drive openings 22 in the center plate 20 are circumferentially spaced apart and located at a same radial distance S from the axis X. However, depending upon the specific load requirements, it is also possible to provide a further embodiment of the clutch 10 where the center plate 20' is as shown in FIG. 9. Here, the spaced apart drive openings in the center plate 20' include a first set of circumferentially spaced apart openings 22' that are located at a first radial distance S1 from the axis X that are adapted to receive the first engagement portions 36a of the first struts, and a second set of circumferentially spaced apart openings 22" that are located at a second radial distance S2 from the axis X that are adapted to receive the second engagement portions 46a of the second struts 46. This would also require locating the corresponding first struts 36 at the first radial distance S1 in the first pocket plate 40 and locating the second struts 46 at the second radial distance S2 in the second pocket plate 50.

In another aspect, a method of operating the dual direction, selectable one-way clutch 10 is provided. The method includes moving both the first and second actuator plates 50, 60 to the respective actuated positions A such that the first engagement portions 36a, 46a of the first and second struts 36, 46 are engaged in the drive openings 22 in the center plate 20 forming a fully locked connection between the first and second shafts 12, 14 in both rotational directions R1, R2.

The method may further include moving the first actuator plate 50 to the deactivated position D such that the first engagement portions 35a are disengaged from the center plate 20 forming a one-way clutch that is active for transferring force only in the second rotational direction R2.

Alternatively, the method can include moving the second actuator plate 60 to the deactivated position D such that the second engagement portions 46a are disengaged from the center plate 20 forming a one-way clutch that is active for transferring force only in the first rotational direction R1.

Additionally, the method may include moving the first and second actuator plates 50, 60 to the respective deactivated positions D such that the first engagement portions 36a, 46a are disengaged from the center plate 20. This allows the first and second shafts 12, 14 to be freely rotatable relative to one another in both rotational directions.

Having thus described the exemplary embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the disclosed embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS

10 Clutch
12 First Shaft
14 Second Shaft
15 Spline
16 Bearing
20, 20' Center plate
22, 22', 22" Drive Openings
22a First circumferential side
22b Second circumferential side
30 First pocket plate 32 First pockets
32a Ledge
36 First struts
36a First engagement portion
36b First actuation portion
36c Shoulder
38 First springs
40 Second pocket plate
42 Second pockets
42a Ledge
45 Second spline support
46 Second struts
48 Second springs
46a Second engagement portion
46b Second actuation portion
46c Shoulder
50 First actuator plate
52 Sliding connection
54 Fork cross-section
56 Groove
60 Second actuator plate
62 Sliding connection
64 Fork cross-section
66 Groove
70a Actuator
70b Actuator
72a First solenoid
72b Second solenoid
73a First solenoid shaft
73b Second solenoid shaft
74a First fork
74b Second fork
77 Detents
80 Pin
82 Spring
A actuated position
D deactivated position
R1 first rotational direction
R2 second rotational direction
S Radial Distance
S1 First radial Distance
S2 Second radial Distance
X Axis

The invention claimed is:

1. A dual direction, selectable one-way clutch, comprising:
first and second concentric shafts;
a center plate rotationally fixed to the first shaft, the center plate including a plurality of spaced apart drive openings;
a first pocket plate rotationally fixed to the second shaft, the first pocket plate including a plurality of first pockets, first struts being pivotally located in at least some of the plurality of first pockets, the first struts including a first engagement portion directed toward the center plate and oriented in a first rotational direction and a first actuation portion directed axially away from the center plate, and the first struts are pivotable between an engaged position in which the first engagement portions are engaged in respective ones of the spaced apart drive openings in the center plate, and a disengaged position, in which the first engagement portions are disengaged from the center plate;
a second pocket plate rotationally fixed to the second shaft and located on an opposite side of the center plate from the first pocket plate, the second pocket plate including a plurality of second pockets, second struts being pivotally located in at least some of the plurality of second pockets, the second struts including a second engagement portion directed toward the center plate and oriented in a second rotational direction, opposite to the first rotational direction, and a second actuation portion directed axially away from the center plate, and the second struts are pivotable between an engaged position in which the second engagement portions are engaged in respective ones of the spaced apart drive openings in the center plate, and a disengaged position, in which the second engagement portions are disengaged from the center plate;
a first actuator plate that is axially movable between an actuated position, in which the first actuation portions of the first struts are in the actuated position with the first engagement portions of the first struts engaged in respective ones of the spaced apart drive openings in the center plate, and a deactivated position, in which the first actuator plate presses the first actuation portions of the first struts axially toward the first pockets such that the first engagement portions of the first struts are in the disengaged position, disengaged from the spaced apart drive openings in the center plate; and
a second actuator plate that is axially movable between an actuated position, in which the second actuation portions of the second struts are in the actuated position with the second engagement portions of the second struts engaged in respective ones of the spaced apart drive openings in the center plate, and a deactivated position, in which the second actuator plate presses the second actuation portions of the second struts axially toward the second pockets such that the second engagement portions of the second struts are in the disengaged position, disengaged from the spaced apart drive openings in the center plate.

2. The clutch of claim 1, wherein with the first and second actuator plates both in the actuated position, a fully locked connection is provided between the first and second shafts in both rotational directions, with the first actuator plate in the actuated position and the second actuator plate in the deactivated position, a one-way clutch is provided that is active for transferring force only in the first rotational direction, with the first actuator plate in the deactivated position and the second actuator plate in the actuated position, a one-way clutch is provided that is active for transferring force only in the second rotational direction, and with the first and second actuator plates both in the deactivated position, the first and second shafts are freely rotatable relative to one another in both rotational directions.

3. The clutch of claim 1, wherein the first and second actuator plates include splined radially inner surfaces that slidingly engage on respective first and second splined supports that are rotationally fixed relative to the second shaft.

4. The clutch of claim 1, further comprising at least one actuator connected to the first and second actuator plates to axially move the first and second actuator plates between the respective actuated and deactivated positions.

5. The clutch of claim 4, wherein the at least one actuator comprises respective first and second actuators that are engaged, respectively, with the first actuator plate and the second actuator plate.

6. The clutch of claim 5, wherein the first actuator comprises a first solenoid connected to a first fork that engages a groove in a radially outer surface of the first actuator plate, and the second actuator comprises a second solenoid connected to a second fork that engages a groove in a radially outer surface of the second actuator plate.

7. The clutch of claim 6, wherein the first fork is connected to a first solenoid shaft, and the first solenoid shaft includes detents for the actuated and deactivated positions of the first actuator plate, and the second fork is connected to a second solenoid shaft, and the second solenoid shaft includes detents for the actuated and deactivated positions of the second actuator plate.

8. The clutch of claim 1, wherein the first and second shafts are both rotatable.

9. The clutch of claim 1, further comprising a plurality of first springs located between the first struts and the first pocket plate that bias the first struts to the engaged position, and a plurality of second springs located between the second struts and the second pocket plate that bias the second struts to the engaged position.

10. The clutch of claim 1, wherein in the engaged position of the first struts, the first engagement portions are engaged against respective first circumferential sides of the spaced apart drive openings in the center plate, and in the engaged position of the second struts, the second engagement portions are engaged against respective second circumferential sides of the spaced apart drive openings in the center plate, opposite from the first circumferential sides.

11. The clutch of claim 1, wherein the spaced apart drive openings in the center plate are circumferentially spaced apart and located at a same radial distance.

12. The clutch of claim 1, wherein the spaced apart drive openings in the center plate include a first set of circumferentially spaced apart openings that are located at a first radial distance that are adapted to receive the first engagement portions, and a second set of circumferentially spaced apart openings that are located at a second radial distance that are adapted to receive the second engagement portions.

13. The clutch of claim 1, wherein the first and second struts have a same strut configuration.

14. The clutch of claim 1, wherein the strut configuration includes the engagement portion having a greater width than the actuation portion, forming a shoulder at a medial portion of the strut configuration, and the first and second pockets each including a ledge located in a medial location on which the shoulder is pivotally supported.

15. A method of operating the dual direction, selectable one-way clutch of claim 1, the method comprising:
    moving both of the first and second actuator plates to the respective actuated positions such that the first engagement portions of the first struts and the second engagement portions of the second struts are engaged in the drive openings in the center plate forming a fully locked connection between the first and second shafts in both rotational directions.

16. The method of claim 15, further comprising moving the first actuator plate to the deactivated position such that the first engagement portions are disengaged from the center plate forming a one-way clutch that is active for transferring force only in the second rotational direction.

17. The method of claim 15, further comprising moving the second actuator plate to the deactivated position such that the second engagement portions are disengaged from the center plate forming a one-way clutch that is active for transferring force only in the first rotational direction.

18. The method of claim 15, further comprising moving the first and second actuator plates to the respective deactivated positions such that the first engagement portions are disengaged from the center plate and the second engagement portions are disengaged from the center plate allowing the first and second shafts to be freely rotatable relative to one another in both rotational directions.

* * * * *